Sept. 1, 1970  NOBUYOSHI SAGUCHI  3,526,419
MANIFOLD COUPLING FOR CONNECTING PIPES TOGETHER
Filed Sept. 11, 1967  4 Sheets-Sheet 1
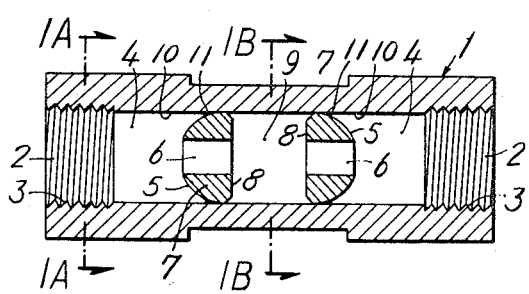
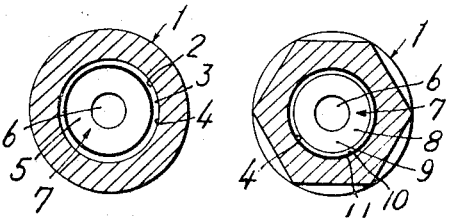
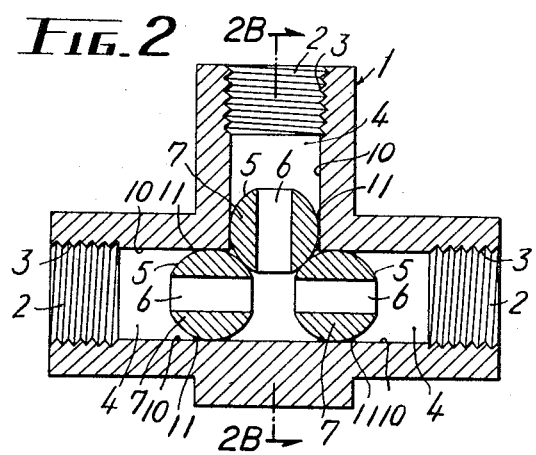
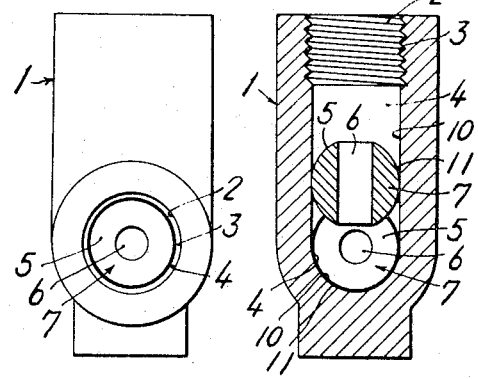
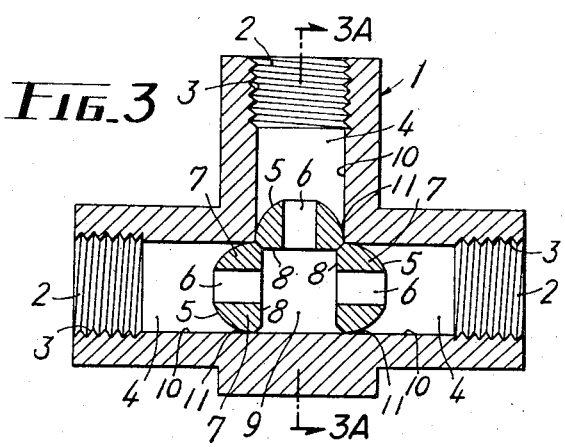
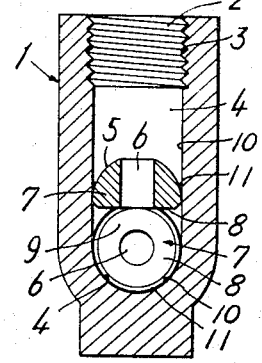
INVENTOR.
NOBUYOSHI SAGUCHI,
BY
Wenderoth, Lind & Ponack
Attorneys

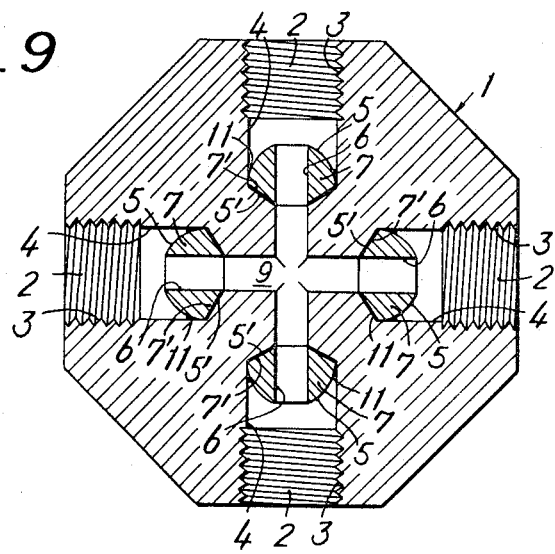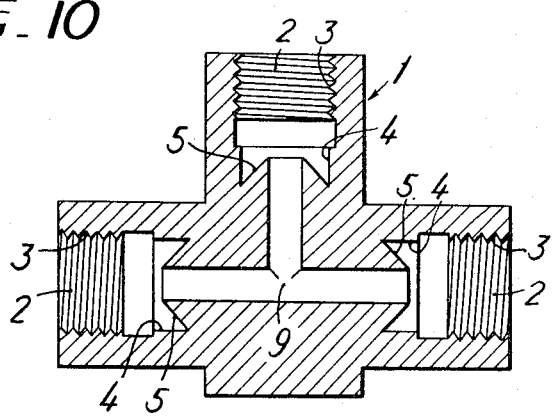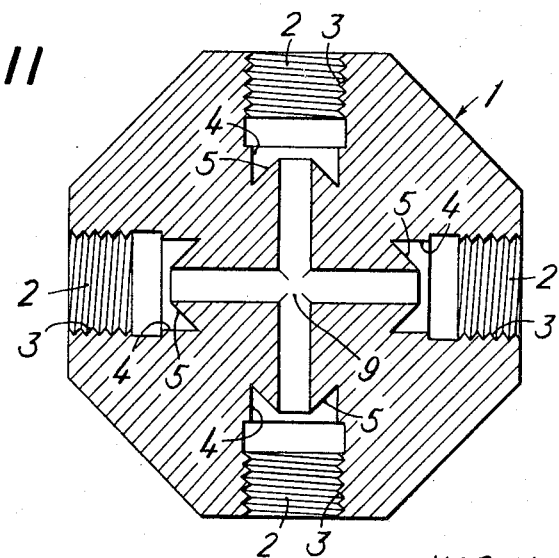

United States Patent Office 3,526,419
Patented Sept. 1, 1970

3,526,419
MANIFOLD COUPLING FOR CONNECTING
PIPES TOGETHER
Nobuyoshi Saguchi, Shizuoka Prefecture, Japan, assignor to Usui Kokusai Sangyo Kabushiki Kaisha, Shimizu-cho, Sunto-gun, Shizuoka-ken, Japan
Filed Sept. 11, 1967, Ser. No. 666,588
Claims priority, application Japan, Feb. 18, 1967, 42/10,094; Apr. 22, 1967, 42/25,422
Int. Cl. F16l 25/00
U.S. Cl. 285—334.1
2 Claims

ABSTRACT OF THE DISCLOSURE

This specification discloses an invention relating to a manifold coupling for connecting pipes together which comprises a steel or iron outer member formed with a hole therethrough and threaded end portions to receive the end of corresponding pipes to be screwed thereinto, and at least a steel or iron seating member having a spherical seating surface and formed with a communicating aperture axially thereof. The seating member is fitted into said hole of said outer member and welded at a portion of its spherical seating surface to the inner side wall of the outer member by means of a bonding agent applied therebetween. Thus the outer member with the apertured seating member bonded thereto forms a manifold coupling for connecting fluid pipes together which is free from any leakage of fluid and easy and economical to manufacture.

This invention relates to a coupling, and more particularly to a manifold coupling for connecting pipes and the method of making the same.

Generally, in a coupling or joint for connecting together the fluid supply or circulating pipes of a relatively small diameter such as those used particularly under vibration in the mechanical apparatuses or vehicles and thereby dividing the path of fluid into multiple paths, it is necessary that the connection of the pipes be made sufficiently rigid to resist the vibration and prevent the connected pipes from being disengaged or spaced from each other. For this purpose use was heretofore made of a brass member having its interior cut away to form an integral coupling structure. However, such known structure not only required very much complicated procedures in the cutting work, but also the cutting work itself was so difficult because of the necessity to form the coupling structure integrally with the outer member in the bottom of the small diameter portion that the shape of the coupling structure was limited to the conical configuration. Moreover, the high cost of the brass material led to a high cost of manufacture, and what is worse, the cost of the brass material for piping has been in the increase. On the other hand, the quality of steel pipes has been so much improved that steel pipes are now finding more extensive use in place of brass pipes. In steel pipes, however, there are found various disadvantages that the possible misalignment between the steel pipe and the seat surface of the coupling would often cause undesirable frictions therebetween which leave scars on the coupling surface, resulting in leakage of fluid when they are disassembled and reassembled, and that the possibility of such leakage further aggravates the matter because this will necessitate the coupling to be fitted more and more tightly with a result that the scars are increased to such a degree that they are fatal to the use of the coupling.

It is therefore the primary object of this invention to provide a manifold coupling for connecting pipes together which eliminates such drawbacks existing in the known coupling and which is easy and economical to manufacture and very effective to use.

According to one aspect of the present invention, there is provided a manifold coupling for connecting pipes which comprises a steel or iron outer member formed with a hole therethrough, said outer member having a threaded portion formed at each end of said hole to receive the end of a corresponding pipe to be screwed thereinto, and a steel or iron seating member having a spherical seating surface and formed with a communicating aperture axially thereof, said seating member being fitted in said hole of said outer member and bonded at a portion of its spherical seating surface closely adjacent said outer member to the inner side wall thereof so as to form a manifold coupling for connecting pipes together.

According to another aspect of the present invention, there is provided a method of manufacturing the manifold coupling of the described construction, which comprises the steps of interposing a bonding metal layer of copper, copper alloy, nickel or nickel alloy between a portion of the spherical seating surface of said seating member and the inner side wall of said outer member in contact therewith, heating said bonding metal layer to its melting point in non-oxidizing environment or reducing environment and thereby achieving a bonding therebetween.

The invention will be described in greater detail with respect to various embodiments as shown in the accompanying drawings, in which:

FIG. 1 shows a longitudinal cross-section of a first embodiment of the present invention;

FIGS. 1A and 1B are cross-sectional views taken along lines 1A—1A and 1B—1B respectively of FIG. 1;

FIG. 2 is a longitudinal cross-sectional view of a second embodiment;

FIG. 2A shows a side view thereof;

FIG. 2B is a cross-sectional view taken along line 2B—2B of FIG. 2;

FIG. 3 illustrates, in longitudinal section, a third embodiment of the invention;

FIG. 3A is a cross-sectional view taken along line 3A—3A of FIG. 3;

FIG. 9 shows a longitudinal cross-sectional view of a ninth embodiment of the invention; and FIGS. 10 and 11 illustrate the conventional couplings in longitudinal cross-section.

Throughout these figures, like reference numerals indicate like or equivalent parts.

EMBODIMENT 1

Figure 4:
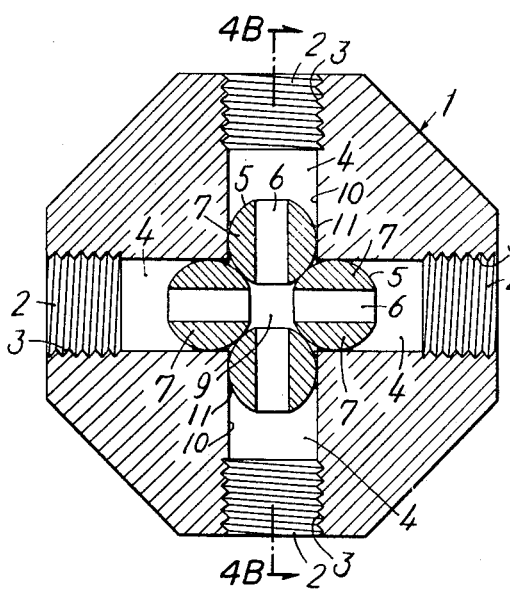
FIG. 4 is a longitudinal section of a fourth embodiment.

Referring now to FIGS. 1, 1A and 1B, there is shown a twofold coupling for connection pipes together embodying the present invention. The twofold coupling includes a steel or iron outer member 1 formed with opening ends 2 and 2, each of which is provided with an internally threaded portion 3 to receive the end of a corresponding pipe (not shown) to be screwed thereinto. A hole 4 is provided axially through the outer member so as to communicate with said opening ends 2 and 2. Within the hole 4 there are disposed a pair of steel or iron seating members 7, 7 each provided externally with a substantially semi-spherical seating surface 5 and axially centrally with a communicating aperture 6. The pair of seating members 7, 7 are opposed to each other with their respective semi-spherical surfaces 5, 5 facing outwardly and their flat inner end surfaces 8, 8 suitably spaced from each other to form a communicating space 9 therebetween. Each of the seating members 7 are secured at a portion of its spherical surface 5 to the inner side wall 10 formed by the hole 4 in the outer member 1, in the manner to be described.

Said seating member 7 is formed of steel or iron shaped into the described configuration by such means as parts former or the like. A bonding metal layer 11 such as a copper plating layer is then provided around the outer surface of said seating member 7, and thereafter the seating member 7 with the bonding metal layer 11 thereon is fitted in the hole 4 of the outer member 1. Alternatively, the shaped steel or iron seating member 7 may be fitted in the hole 4 in closely spaced relationship therewith prior to the application of the bonding metal layer, and subsequently a bonding metal layer 11 of copper, copper alloy, nickel or nickel alloy in a linear form or in viscous powder form may be applied around the seating member 7. In any of these alternative cases, the bonding metal layer 11 on the seating member 7 is then heated to its melting point in non-oxidizing environment or reducing environment and thereby fused to completely bond the seating member 7 to the inner wall of the outer member 1 to form an integral structure.

This structure permits ready and simple work and assembly without application of complicated cutting procedures, and consequently ensures reliable and high-speed mass production of the couplings of the described type. Moreover, the use of steel or iron as the material which is less expensive than brass leads to the lower cost of manufacture. Additionally, there is no possibility of scars being formed on the seating member even if the coupling should be misaligned with the corresponding pipes, and therefore the possibility of leakage of fluid is also eliminated and thus there is obtained a highly efficient coupling which always provides a strong and safe coupling effect without the necessity of excessively tightening during the assembly. Furthermore, the fluid pressure may be adjusted by said communicating space 9 so that the flow of fluid is made smooth.

EMBODIMENT 2

A second embodiment of the present invention is illustrated in FIGS. 2, 2A and 2B which show a threefold coupling for connection pipes. As shown, this structure employs three spherical seating members, each having a substantially spherical seating surface, and these three seating members are mounted in three outer members respectively so as to form a threefold coupling. In the figures, there is shown a three-way outer member made of steel or iron and generally designated by the reference numeral 1. The three-way outer member 1 has three opening ends 2, each of which is internally threaded at 3. These opening ends 2 are communicated with each other through communicating holes 4 provided in the three-way outer member 1. Within each of these three communicating holes 4 is mounted a steel or iron seating member 7 having a spherical seating surface 5 and a communicating aperture or passageway 6 formed therethrough. The numeral 8 represents the spherical inner end surface of each of said spherical seating members 7 and the numeral 9 denotes a central communicating chamber 9 defined by said spherical inner end surfaces 8 of the seating members 7. The numeral 10 shows the inner walls of the three-way outer member 1. Bonding metal layers 11 are disposed between the inner walls 10 of the outer member 1 and each of the spherical seating members 7.

It will be seen that the structure of this second embodiment is similar to the previous embodiment in the manner of working and assembly and the method of manufacture as well as in operation.

EMBODIMENT 3

In FIGS. 3 and 3A there is shown still another form of threefold coupling embodying the present invention which is similar to embodiment 2. In this structure like parts are designated by like numerals, and there is no substantial difference between this embodiment and the preceding embodiment in both structure and operation, with the only exception that the steel or iron seating members 7 has a semi-spherical shape with their inner end surface 8 being flat so that these flat inner end surfaces define a square central communicating chamber 9 in the outer member 1.

EMBODIMENT 4

Figure 4A:
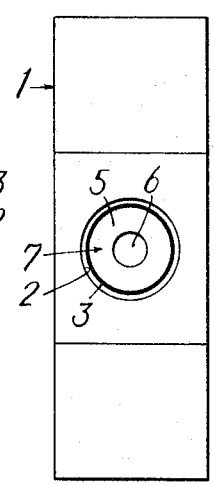
FIG. 4A shows a side view thereof.
Figure 4B:
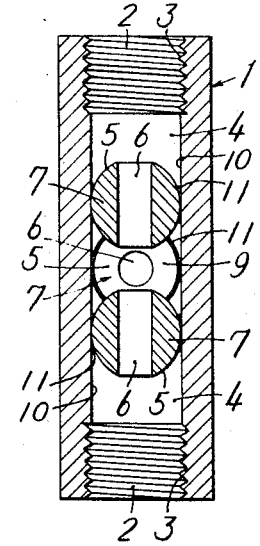
FIG. 4B is a cross-section taken along line 4B—4B of FIG. 4.

A fourth embodiment of the invention is shown in FIGS. 4, 4A and 4B, in which a fourfold coupling for connecting pipes comprises a four-way outer member 1 made of steel or iron having four opening ends 2 each of which is internally threaded at 3 and communicated with communicating holes 4, and four spherical seating members 7 made of steel or iron. Each of these spherical seating members is provided with a spherical surface 5, a communication aperture 6 formed therethrough, and an inner end surface 8. These flat inner end surfaces define a central communicating chamber 9 within the outer member. The numeral 10 shows the inner walls of the outer member 1 and there are provided bonding metal layers 11 between the inner walls of the outer member and each of the seating members 7.

This embodiment is also essentially similar to those as shown and described above in the manner of assembly and operational effect.

EMBODIMENT 5

Figure 5:
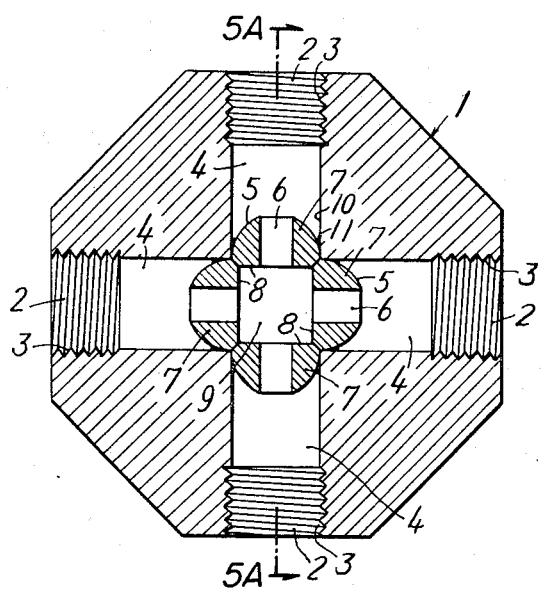
FIG. 5 illustrates a longitudinal sectional view of a fifth embodiment.
Figure 5A:
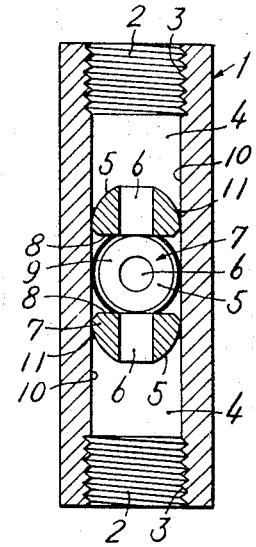
FIG 5A is a sectional view taken along line 5A—5A of FIG. 5.

In FIGS. 5 and 5A there is shown a slightly modified form of fourfold coupling for connecting pipes embodying the present invention. As will be readily seen from these figures, this embodiment includes four seating members 7 made of steel or iron, each of which has a semi-spherical seating surface 5 and a flat inner end surface 8, and these flat inner end surfaces 8 define a square central communicating chamber 9 which is communicated with four communicating holes 4 through communicating apertures 6 formed through the seating members 7. In other respects this structure is essentially the same as or similar to the previously described embodiments.

EMBODIMENT 6

Figure 6A:
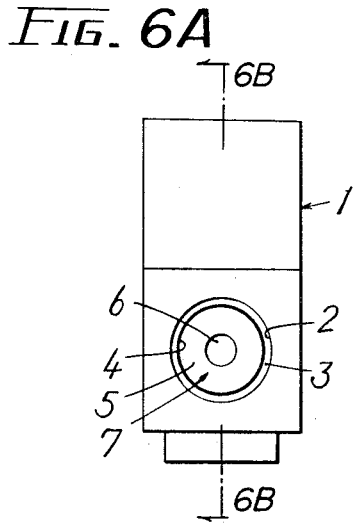
FIG. 6A is a front view showing a sixth embodiment of the invention as applied to a threefold piping.
Figure 6B:
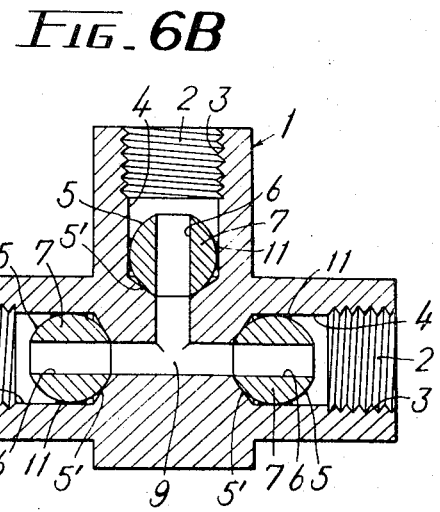
FIG. 6B is a cross-sectional view taken along line 6B—6B of FIG. 6A.

As shown in FIGS. 6 and 6A, this embodiment is for use with a threefold piping. The coupling of this embodiment comprises a steel or iron outer member 1 having three opening ends 2, each of which is internally threaded at 3 to receive the end of a corresponding pipe (not shown). Holes 4 are formed through the outer member 1 to communicate the respective opening ends 2 with communicating apertures 9 formed in the center of the outer member 1. Seating surfaces are provided on the bottom of the holes 4. This structure, as far as described above, is similar to the conventional arrangement. However, it should be particularly noted in this embodiment that, instead of providing such seating surfaces in the bottoms of the holes 4 per se, auxiliary conical seating surfaces 5′ are formed in said bottoms, and on each of these auxiliary conical seating surfaces 5′ is seated a steel or iron seating member 7 having a spherical seating surface 5 and a communicating aperture 6 formed therethrough with the same diameter as the communicating apertures 9. These seating members 7 are bonded to the outer member 1 in the manner to be described.

These seating members 7 may be commercially available steel balls for bearing or may be steel or iron material which may be formed by means of a part former or the like. A bonding metal layer 11 such as copper plating is applied around the outer surface of each seating member 7, which is then fitted into the hole 4 of the outer member 1. Or alternatively, a welding metal such as copper or copper alloy in a linear form or in viscous powder form may be pasted or otherwise applied as the bonding metal layer 11 around the surface part of each seating member 7 closely adjacent the outer member after the seating members have been fitted into the holes 4. The seating members 7 with the bonding metal layers 11 are introduced into non-oxidizing or reducing environment to be heated up to the fusing point of the bonding metal, which is fused to achieve a complete bonding between the outer member 1 and the seating member 7 so as to form these members into an integral structure.

According to this structure, the working and assembly can be simply and readily be carried out without troublesome cutting procedures and therefore quick and reliable mass production can be provided. Furthermore the use of steel or iron material which is less expensive than brass material leads to a more economical cost of material. Still furthermore, even if there is caused a degree of misalignment between the coupling structure and the corresponding pipes, no scar can be produced on the seating members thus eliminating the possibility of fluid leakage. This also eliminates the necessity of too firmly tightening the coupling to assemble it to the pipes. Thus the assembly can maintain its highly effective and safe operation as a coupling structure at all times. In addition, the fact that the same diameter is employed for the communicating apertures 6 in the seating member 7 and the communicating apertures 9 in the outer member 1 is useful in that the air entering or remaining in these apertures is completely pushed away by the pressure of oil supply to enable the oil pressure without air to be efficiently exerted on the brake of the vehicle or the like and thereby attain a sufficient braking pressure.

EMBODIMENT 7

Figure 7:
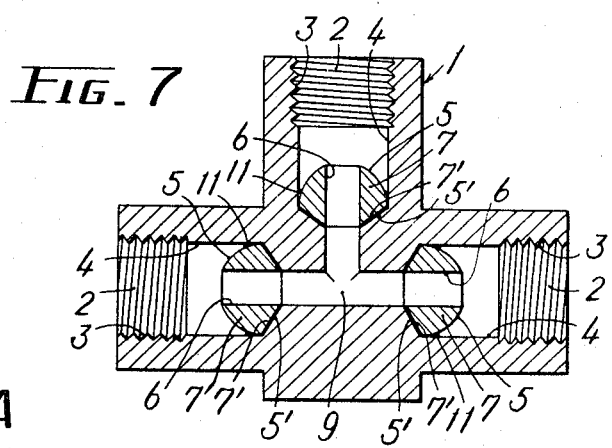
FIG. 7 is a longitudinal cross-sectional view of a seventh embodiment of the invention.

This embodiment is shown in FIG. 7, in which the seating members 7 are provided with conical contact surfaces 7′ which contact the auxiliary seating surfaces 5′. In this respect the shown embodiment differs from the first embodiment, whereas the major parts are quite similar to those of the first embodiment.

EMBODIMENT 8

Figure 8A:
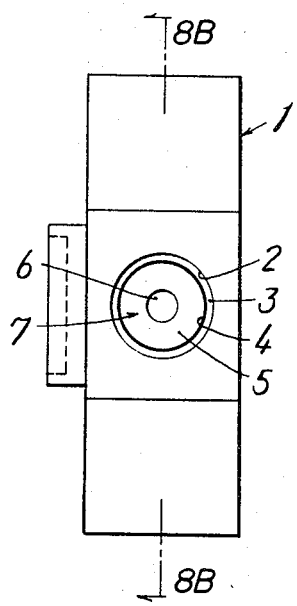
FIG. 8A is a front view of an eighth embodiment of the invention as applied to a fourfold piping.
Figure 8B:
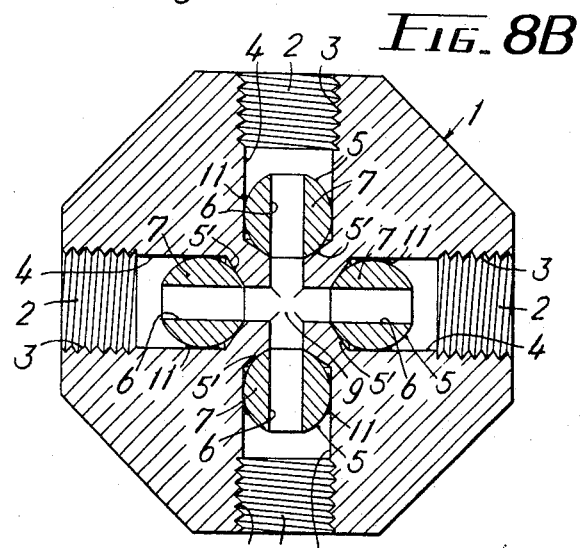
FIG. 8B is a sectional view taken along line 8B—8B of FIG. 8A.

As illustrated in FIGS. 8 and 8A, this is an example in which the structure of Embodiment 6 is applied to a fourfold pipe coupling, and it is essentially the same as that embodiment.

EMBODIMENT 9

This embodiment, as shown in FIG. 9, is a form of the invention in which the arrangement of Embodiment 7 is applied to a fourfold coupling, and it also achieves the same end result.

Now, description will be made of examples of the method of carrying out the present invention.

Example 1.—For threefold piping consisting of pipes of 6.35$\phi$

Material used for the coupling body:
 JIS–SS41—rolled steel for ordinary construction, with internal diameter of the bore 10.94$\phi$±0.02

Material used for the seating member:
 JIS–S15C—carbon steel for mechanical construction, shaped by parts former, with outer diameter 11.0$\phi$±0.02

Mounting of the seating member into the bore of the coupling body:
 The seating member is fitted into the bore by a manually operated press, whereafter a viscous powder agent of nickel alloy (nickel, chromium, silicon and boron) is applied around the seating member in that portion immediately adjacent the inner wall of the coupling body.

Welding.—Effected by furnace brazing in non-oxidizing environment:
 Temperature—1155° C.
 Time—8 minutes
 Conveyor speed—400 mm/min.

Example 2.—For fourfold piping consisting of pipes of 4.76$\phi$

Material used for the coupling body:
 JIS–S15C—carbon steel for mechanical construction, with internal diameter of the bore 8.94$\phi$±0.02

Material used for the seating member:
 JIS–SWRM3—soft steel ball for bearing, with diameter 9.0$\phi$±0.02

Plating treatment around the outer periphery of the seating member:
 Copper coating of 8 to 13$\mu$ formed by ordinary electrodeposition plating Fitting of the seating member into the bore of the coupling body:
 Effected by a manually operated press Welding.—Effected by furnace brazing in reducing environment:
 Temperature—1087° C.
 Time—5 minutes
 Conveyor speed—450 mm./min.

What is claimed is:

1. A manifold coupling for connecting pipes together, comprising a steel or iron outer member formed with a plurality of holes therethrough, said holes being defined by inner wall portions of said outer member of substantially constant diameter, said outer member having a threaded portion formed at the end of each of said holes to receive the end of a corresponding pipe to be screwed thereinto, and steel or iron seating members each having a spherical seating surface and formed with a communicating aperture of a smaller diameter than and communicating with said holes, said seating members being fitted within said holes in said outer member so as to define a central communicating chamber with said outer member communicating with said apertures of the seating members, said spherical seating surface of each seating member facing the threaded end of the hole in which it is fitted, each of said seating members being welded at a portion of its spherical seating surface of the inner wall portion of said outer member adjacent said central communicating chamber.

2. A manifold coupling for connecting pipes together, comprising a steel or iron outer member having an inner wall of substantially constant diameter defining a hole therethrough, said outer member having a threaded portion formed at each end of said hole to receive the end of a corresponding pipe to be screwed thereinto, and two steel or iron seating members having a spherical seating surface and formed with a communicating aperture axially thereof, said seating members being fitted in said hole of said outer member and welded at a portion of its spherical seating surface closely adjacent said outer member to the inner wall thereof, and said seating members having flat inner end surfaces suitably spaced from each other to form a communicating chamber therebetween.

References Cited

UNITED STATES PATENTS

| | | | |
|---|---|---|---|
| 806,156 | 12/1905 | Marshall | 285—334.2 X |
| 1,803,578 | 5/1931 | Weatherhead | 285—156 |
| 1,825,034 | 9/1931 | Weatherhead | 285—150 |
| 2,332,354 | 10/1943 | Stecher | 285—334.5 X |
| 2,399,275 | 4/1946 | Wenk | 285—334.2 X |
| 3,112,131 | 11/1963 | Campbell | 285—334.5 |

DAVE W. AROLA, Primary Examiner

U.S. Cl. X.R.

285—150, 286, 334.5